United States Patent
Özlütürk et al.

(10) Patent No.: US 6,483,868 B2
(45) Date of Patent: Nov. 19, 2002

(54) PROCESSING FOR IMPROVED PERFORMANCE AND REDUCED PILOT

(75) Inventors: Fatih M. Özlütürk, Port Washington, NY (US); David K. Mesecher, Huntington Station, NY (US); Alexander M. Jacques, Kings Park, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/008,411

(22) Filed: Nov. 13, 2001

(65) Prior Publication Data

US 2002/0039382 A1 Apr. 4, 2002

Related U.S. Application Data

(63) Continuation of application No. 09/078,417, filed on May 14, 1998, now Pat. No. 6,366,607.

(51) Int. Cl.$^7$ .............................. H04L 27/30; H04J 1/00
(52) U.S. Cl. ........................ 375/152; 375/147; 370/342
(58) Field of Search ................................. 375/152, 147, 375/150, 376, 375, 341; 370/320, 342, 335, 441

(56) References Cited

U.S. PATENT DOCUMENTS

| | | | |
|---|---|---|---|
| 5,579,338 A | 11/1996 | Kojima | 375/149 |
| 5,619,524 A | 4/1997 | Ling et al. | 375/377 |
| 5,757,865 A | 5/1998 | Kaku et al. | 375/344 |
| 5,930,288 A | 7/1999 | Eberhardt | 375/148 |
| 6,055,231 A | 4/2000 | Mesecher et al. | 375/342 |
| 6,178,194 B1 * | 1/2001 | Vasic | 375/136 |
| 6,192,068 B1 * | 2/2001 | Fattouche et al. | 375/130 |

FOREIGN PATENT DOCUMENTS

| | | |
|---|---|---|
| EP | 0675606 | 10/1995 |
| EP | 0716520 | 6/1996 |

OTHER PUBLICATIONS

Sadayuki et al., A Coherent Detection System with a Suppressed Pilot Channel for DS/CDMA Systems, Electronics and Communications in Japan, Part 1, vol. 79, No. 4, 1996, pp. 95–102.

* cited by examiner

Primary Examiner—Chi Pham
Assistant Examiner—Khai Tran
(74) Attorney, Agent, or Firm—Volpe & Koenig, P.C.

(57) ABSTRACT

A digital spread spectrum communication system employing pilot-aided coherent multipath demodulation effects a substantial reduction in global-pilot and assigned-pilot overheads. The system and method uses a QPSK-modulated data signal whereby the modulated data is removed and the recovered carrier is used for channel amplitude and phase estimation. The resulting signal has no data modulation and is used as a pseudo-pilot signal. In conjunction with the pseudo-pilot signal, a multiple-input phase-locked loop is employed further eliminating errors due to carrier-offset by using a plurality of pseudo-pilot signals. A pilot signal is required to resolve absolute phase ambiguity, but at a greatly reduced magnitude.

21 Claims, 13 Drawing Sheets

Inphase bit stream (I)

Quadrature bit stream (Q)

pn sequence (I or Q)

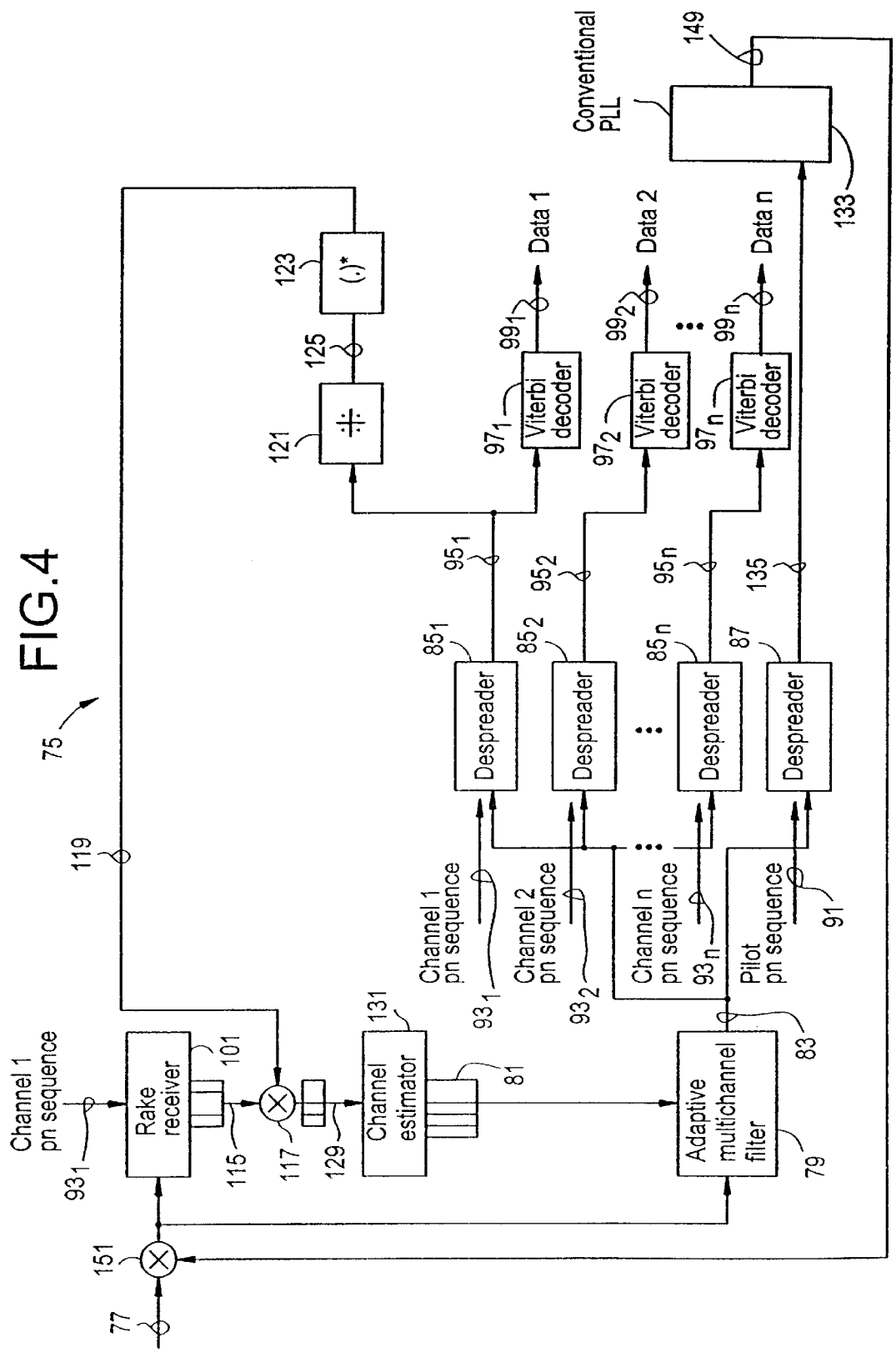

US 6,483,868 B2

PROCESSING FOR IMPROVED PERFORMANCE AND REDUCED PILOT

CROSS REFERENCE TO RELATED APPLICATIONS

This application is a continuation of application Ser. No. 09/078,417, filed on May 14, 1998. Now U.S. Pat. No. 6,366,607.

BACKGROUND

1. Field of the Invention

The present invention relates generally to digital communications. More specifically, the invention relates to a system for and method of using a code division multiple access air interface which greatly reduces the signal power required for the global and assigned-pilots while improving performance by using the quadrature phase shift keyed (QPSK) traffic signal for a particular channel to perform channel estimation and carrier recovery.

2. Description of the Prior Art

Most advanced communication technology today makes use of digital spread spectrum modulation or code divisional multiple access (CDMA). Digital spread spectrum is a communication technique in which data is transmitted with a broadened band (spread spectrum) by modulating the data to be transmitted with a pseudo-noise signal. CDMA can transmit data without being affected by signal distortion or an interfering frequency in the transmission path.

Shown in FIG. 1 is a simplified CDMA communication system that involves a single communication channel of a given bandwidth which is mixed by a spreading code which repeats a predetermined pattern generated by a pseudo-noise (pn) sequence generator. A data signal is modulated with the pn sequence producing a digital spread spectrum signal. A carrier signal is then modulated with the digital spread spectrum signal establishing a forward link, and transmitted. A receiver demodulates the transmission extracting the digital spread spectrum signal. The transmitted data is reproduced after correlation with the matching pn sequence. The same process is repeated to establish a reverse link.

During terrestrial communication, a transmitted signal is disturbed by reflection due to varying terrain and environmental conditions and man-made obstructions. This produces a plurality of received signals with differing time delays at the receiver. This effect is commonly known as multipath propagation. Moreover, each path arrives delayed at the receiver with a unique amplitude and carrier phase.

To identify the multiple components in the multipath propagation, the relative delays and amplitudes and phases must be determined. This determination can be performed with a modulated data signal, but typically, a more precise rendering is obtained when compared to an unmodulated signal. In most digital spread spectrum systems, it is more effective to use an unmodulated pilot signal discrete from the transmitted modulated data by assigning the pilot an individual pn sequence. A global-pilot signal is most valuable on systems where many signals are transmitted from a base station to multiple users.

In the case of a base station which is transmitting many channels, the global-pilot signal provides the same pilot sequence to the plurality of users serviced by that particular base station and is used for the initial acquisition of an individual user and for the user to obtain channel-estimates for coherent reception and for the combining of the multipath components. However, at the required signal strength, the global-pilot signal may use up to 10 percent of the forward direction air capacity.

Similar multipath distortion affects a user's reverse link transmission to the base station. Inserting in each individual user's return signal an assigned-pilot may consume up to 20 percent of the total reverse channels air capacity.

Without phase and amplitude estimation, noncoherent or differentially coherent reception techniques must be performed. Accordingly, there exists a need for a coherent demodulation system that reduces the air capacity of the global-pilot and assigned-pilot signals while maintaining the desired air-interface performance.

SUMMARY

The present invention relates to a digital spread spectrum communication system that employs pilot-aided coherent multipath demodulation with a substantial reduction in global-pilot and assigned-pilot overheads. The system and method uses a QPSK-modulated data signal whereby the modulated data is removed and the recovered carrier is used for channel amplitude and phase estimation. The resulting signal has no data modulation and is used as a pseudo-pilot signal. In conjunction with the pseudo-pilot signal, a multiple-input phase-locked loop is employed further eliminating errors due to carrier-offset by using a plurality of pseudo-pilot signals. A pilot signal is still required to resolve absolute phase ambiguity, but at a greatly reduced magnitude.

Accordingly, it is an object of the present invention to provide a code division multiple access communication system which reduces the required global and assigned-pilot signal strength.

It is a further object of the invention to reduce the transmitted levels of the global and assigned-pilots such that they consume negligible overhead in the air interface while providing information necessary for coherent demodulation.

Other objects and advantages of the system and method will become apparent to those skilled in the art after reading the detailed description of the preferred embodiment.

BRIEF DESCRIPTION OF THE DRAWINGS

FIG. 4 is a detailed block diagram of the present invention using one pseudo-pilot signal, with carrier-offset correction implemented at the chip level.

DETAILED DESCRIPTION OF THE PREFERRED EMBODIMENTS

Figure 1:
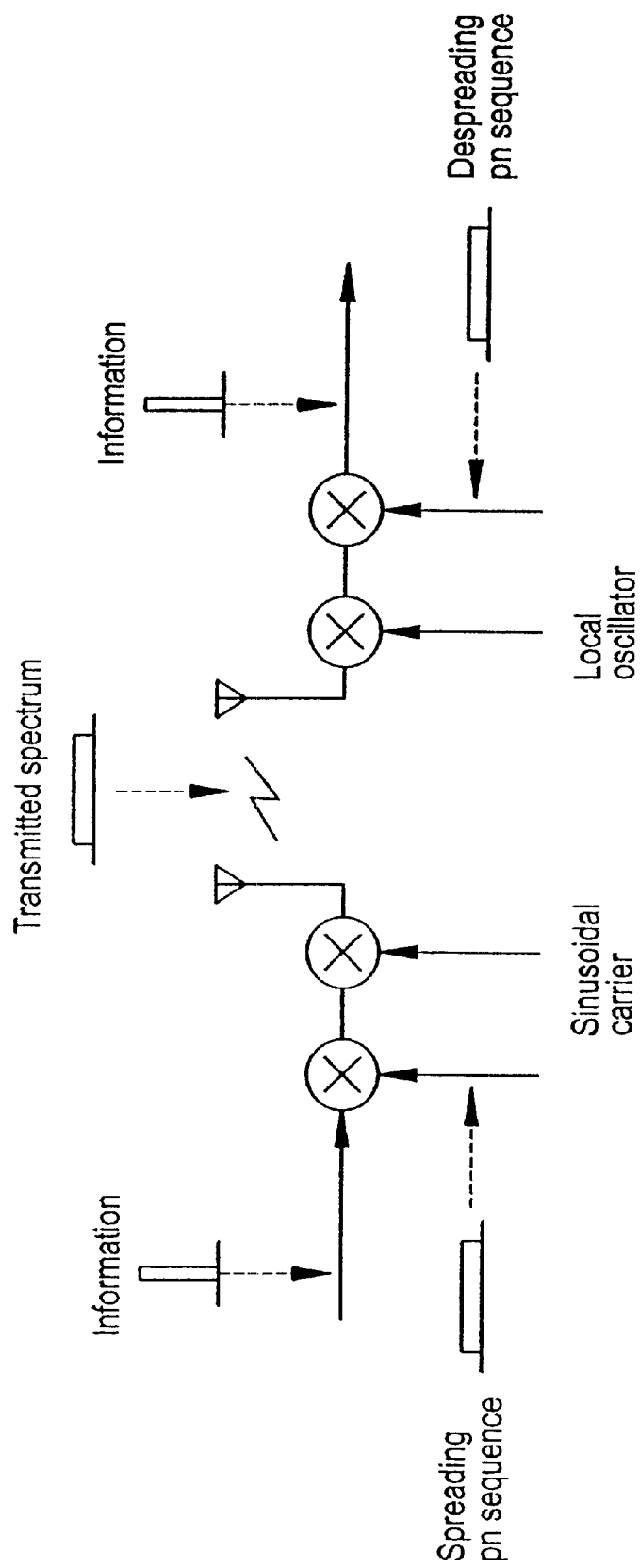
FIG. 1 is a simplified block diagram of a typical, prior art, CDMA communication system.

The preferred embodiment will be described with reference to the drawing figures where like numerals represent like elements throughout.

Figure 2:
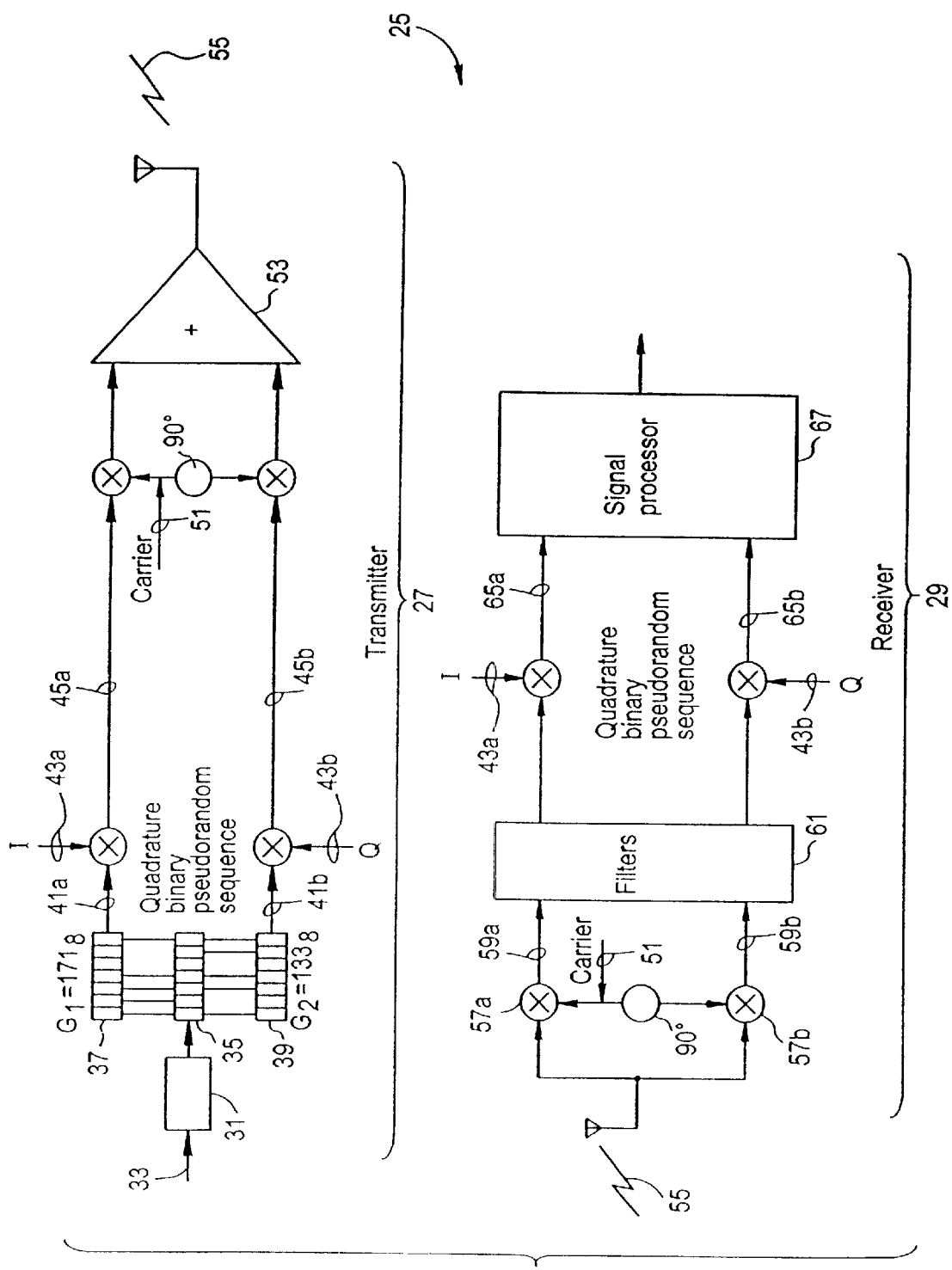
FIG. 2 is a detailed block diagram of a B-CDMA™ communication system.

A B-CDMA™ communication system 25 as shown in FIG. 2 includes a transmitter 27 and a receiver 29, which may reside in either a base station or a mobile user receiver. The transmitter 27 includes a signal processor 31 which encodes voice and nonvoice signals 33 into data at various rates, e.g. data rates of 8 kbps, 16 kbps, 32 kbps, or 64 kbps. The signal processor 31 selects a rate in dependence upon the type of signal, or in response to a set data rate.

By way of background, two steps are involved in the generation of a transmitted signal in a multiple access environment. First, the input data 33 which can be considered a bi-phase modulated signal is encoded using forward error-correcting coding (FEC) 35. For example, if a R=½ convolution code is used, the single bi-phase modulated data signal becomes bivariate or two bi-phase modulated signals. One signal is designated the in-phase channel I 41a. The other signal is designated the quadrature channel Q 41b. A complex number is in the form a+bj, where a and b are real numbers and $j^2=-1$. Bi-phase modulated I and Q signals are usually referred to as quadrature phase shift keying (QPSK). In the preferred embodiment, the tap generator polynomials for a constraint length of K=7 and a convolutional code rate of R=½ are $G_1=171_8$ 37 and $G_2=133_8$ 39.

In the second step, the two bi-phase modulated data or symbols 41a, 41b are spread with a complex pseudo-noise (pn) sequence. The resulting I 45a and Q 45b spread signals are combined 53 with other spread signals (channels) having different spreading codes, multiplied (mixed) with a carrier signal 51, and transmitted 55. The transmission 55 may contain a plurality of individual channels having different data rates.

The receiver 29 includes a demodulator 57a, 57b which mixes down the transmitted broadband signal 55 into an intermediate carrier frequency 59a, 59b. A second down conversion reduces the signal to baseband. The QPSK signal is then filtered 61 and mixed 63a, 63b with the locally generated complex pn sequence 43a, 43b which matches the conjugate of the transmitted complex code. Only the original waveforms which were spread by the same code at the transmitter 27 will be effectively despread. Others will appear as noise to the receiver 29. The data 65a, 65b is then passed onto a signal processor 59 where FEC decoding is performed on the convolutionally encoded data.

Figure 3A:
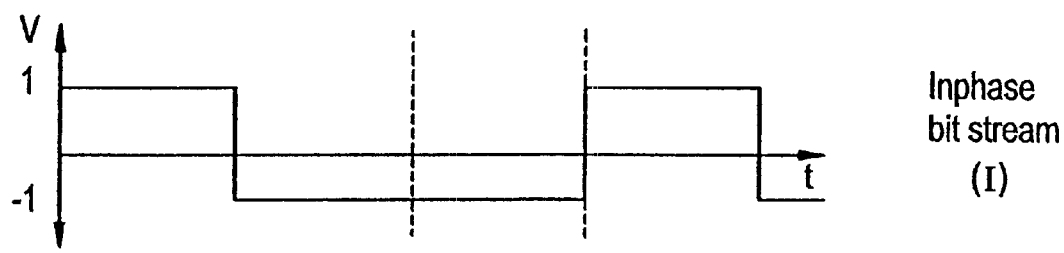
FIG. 3A is a plot of an in-phase bit stream.
Figure 3B:
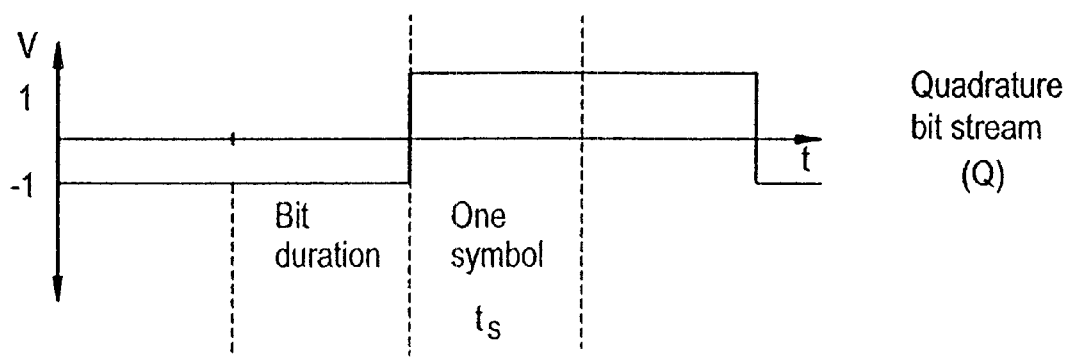
FIG. 3B is a plot of a quadrature bit stream.

As shown in FIGS. 3A and 3B, a QPSK symbol consists of one bit each from both the in-phase (I) and quadrature (Q) signals. The bits may represent a quantized version of an analog sample or digital data. It can be seen that symbol duration $t_s$ is equal to bit duration.

Figure 3C:
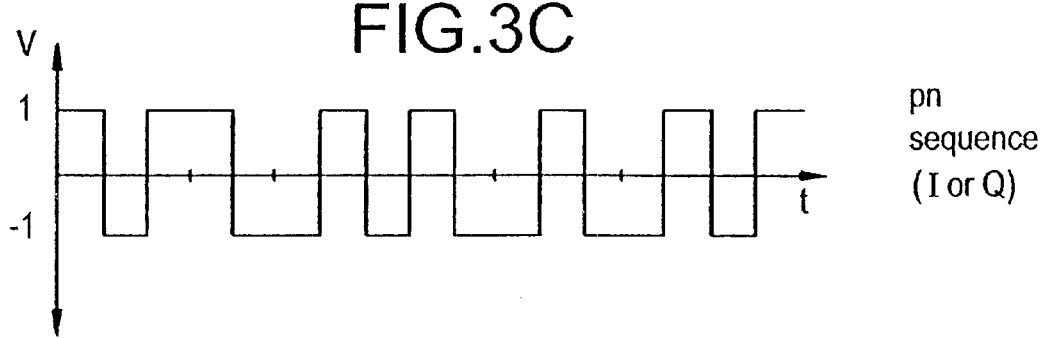
FIG. 3C is a plot of a pseudo-noise (pn) bit sequence.

The transmitted symbols are spread by multiplying the QPSK symbol stream by a unique complex pn sequence. Both the I and Q pn sequences are comprised of a bit stream generated at a much higher rate, typically 100 to 200 times the symbol rate. One such pn sequence is shown in FIG. 3C. The complex pn sequence is mixed with the complex-symbol bit stream producing the digital spread signal. The components of the spread signal are known as chips having a much smaller duration $t_c$.

When the signal is received and demodulated, the baseband signal is at the chip level. Both the I and Q components of the signal are despread using the conjugate of the pn sequence used during spreading, returning the signal to the symbol level. However, due to carrier-offset, phase corruption experienced during transmission manifests itself by distorting the individual chip waveforms. If carrier-offset correction is performed at the chip level, it can be seen that overall accuracy increases due to the inherent resolution of the chip-level signal. Carrier-offset correction may also be performed at the symbol level, but with less overall accuracy. However, since the symbol rate is much less than the chip rate, less overall processing speed is required when the correction is done at the symbol level.

System architectures for receivers taught in accordance with the system and method of the present invention that do not require large magnitude pilot signals follow. The following systems replace the filtering, despreading and signal processing shown in FIG. 2. The systems are implemented with carrier-offset correction at both the chip and symbol levels.

As shown in FIG. 4, a receiver using the system 75 and method of the present invention is shown. A complex baseband digital spread spectrum signal 77 comprised of in-phase and quadrature phase components is input and filtered using an adaptive matched filter (AMF) 79 or other adaptive filtering means. The AMF 79 is a transversal filter (finite impulse response) which uses filter coefficients 81 to overlay delayed replicas of the received signal 77 onto each other to provide a filtered signal 83 having an increased signal-to-noise ratio (SNR). The output 83 of the AMF 79 is coupled to a plurality of channel despreaders $85_1$, $85_2$, $85_n$ and a pilot despreader 87. In the preferred embodiment, n=3. The pilot signal 89 is despread with a separate despreader 87 and pn sequence 91 contemporaneous with the transmitted data 77 assigned to channels which are despread $85_1$, $85_2$, $85_n$ with pn sequences $93_1$, $93_2$, $93_n$ of their own. After the data channels are despread $85_1$, $85_2$, $85_n$, the data bit streams $95_1$, $95_2$, $95_n$ are coupled to Viterbi decoders $97_1$, $97_2$, $97_n$ and output $99_1$, $99_2$, $99_n$.

The filter coefficients 81, or weights, used in adjusting the AMF 79 are obtained by the demodulation of the individual multipath propagation paths. This operation is performed by a rake receiver 101. The use of a rake receiver 101 to compensate for multipath distortion is well known to those skilled in the communication arts.

Figure 5:
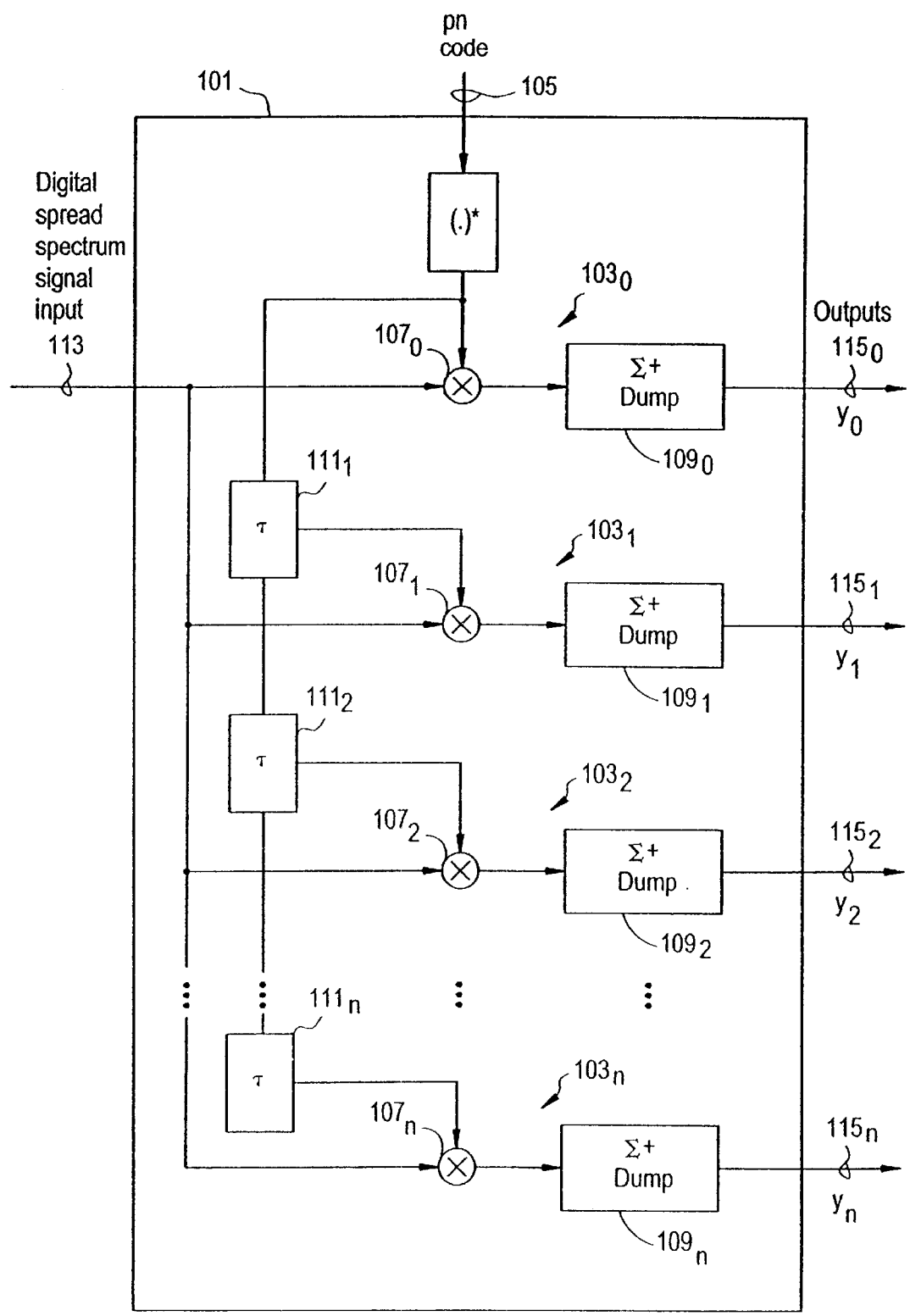
FIG. 5 is a block diagram of a rake receiver.

As shown in FIG. 5, the rake receiver 101 consists of a parallel combination of path demodulators ("fingers") $103_0$, $103_1$, $103_2$, $103_n$ which demodulate a particular multipath component. The pilot sequence tracking loop of a particular demodulator is initiated by the timing estimation of a given path as determined by a pn sequence 105. In the prior art, a pilot signal is used for despreading the individual signals of the rake. In this embodiment of the present invention, the pn sequence 105 may belong to any channel $93_1$ of the communication system. The channel with the largest received signal is typically used.

Each path demodulator includes a complex mixer $107_0$, $107_1$, $107_2$, $107_n$, and summer and latch $109_0$, $109_1$, $109_2$, $109_n$. For each rake element, the pn sequence 105 is delayed τ $111_1$, $111_2$, $111_n$ by one chip and mixed $107_1$, $107_2$, $107_n$ with the baseband spread spectrum signal 113 thereby despreading each signal. Each multiplication product is input into an accumulator $109_0$, $109_1$, $109_2$, $109_n$ where it is added to the previous product and latched out after the next symbol-clock cycle. The rake receiver 101 provides relative path values for each multipath component. The plurality of n-dimension outputs $115_0$, $115_1$, $115_2$, $115_n$ provide estimates of the sampled channel impulse response that contain a relative phase error of either 0°, 90°, 180°, or 270°.

Referring back to FIG. 4, the plurality of outputs from the rake receiver are coupled to an n-dimensional complex mixer 117. Mixed with each rake receiver 101 output 115 is a correction to remove the relative phase error contained in the rake output.

A pilot signal is also a complex QPSK signal, but with the quadrature component set at zero. The error correction 119 signal of the present invention is derived from the despread channel $95_1$ by first performing a hard decision 121 on each of the symbols of the despread signal $95_1$. A hard decision processor 121 determines the QPSK constellation position that is closest to the despread symbol value.

Figure 6:
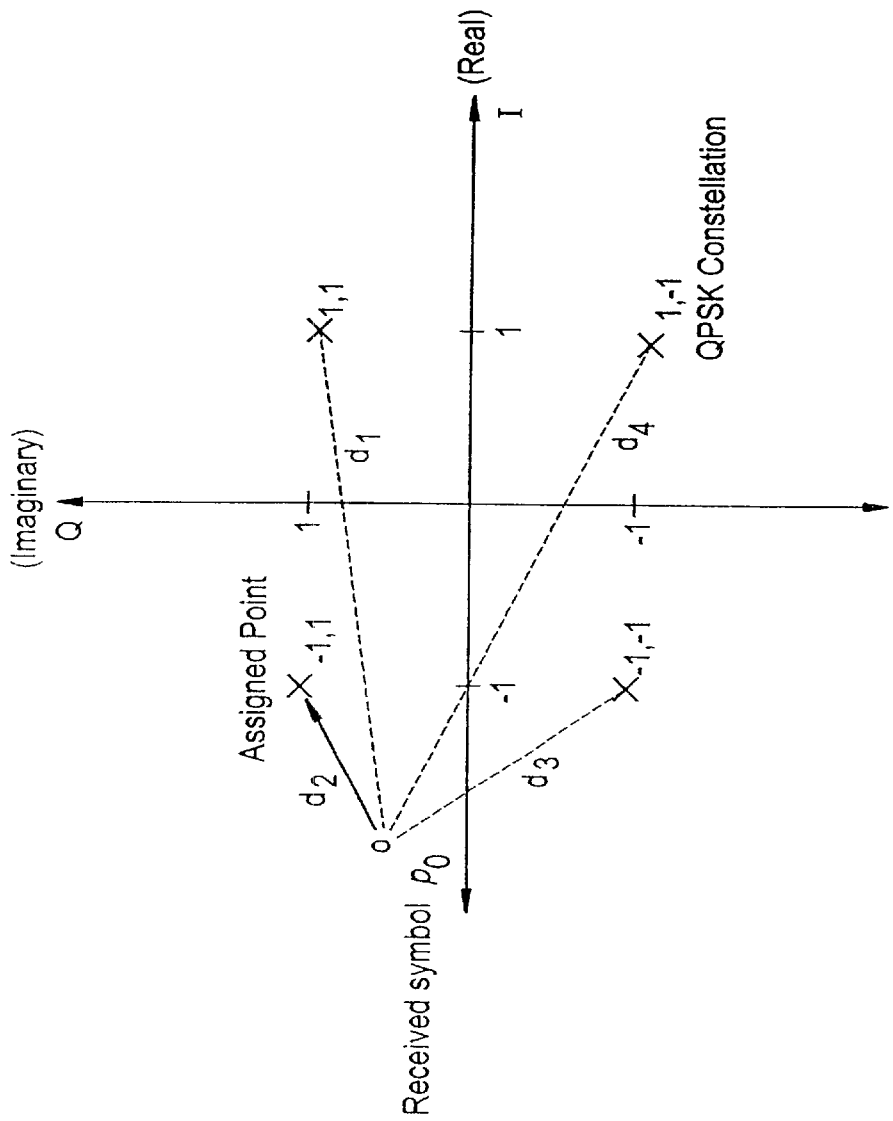
FIG. 6 is a diagram of a received symbol $p_o$ on the QPSK constellation showing a hard decision.

As shown in FIG. 6, the Euclidean distance processor compares a received symbol $p_o$ of channel 1 to the four QPSK constellation points $x_{1,1}$, $x_{-1,1}$, $x_{-1,-1}$, $x_{1,-1}$. It is necessary to examine each received symbol $p_o$ due to corruption during transmission 55 by noise and distortion, whether multipath or radio frequency. The hard decision processor 121 computes the four distances $d_1$, $d_2$, $d_3$, $d_4$ to each quadrant from the received symbol $p_o$ and chooses the shortest distance $d_2$ and assigns that symbol location $x_{-1,1}$. The original symbol coordinates $p_o$ are discarded.

Referring back to FIG. 4, after undergoing each hard symbol decision 121, the complex conjugates 123 for each symbol output 125 are determined. A complex conjugate is one of a pair of complex numbers with identical real parts and with imaginary parts differing only in sign.

Figure 7:
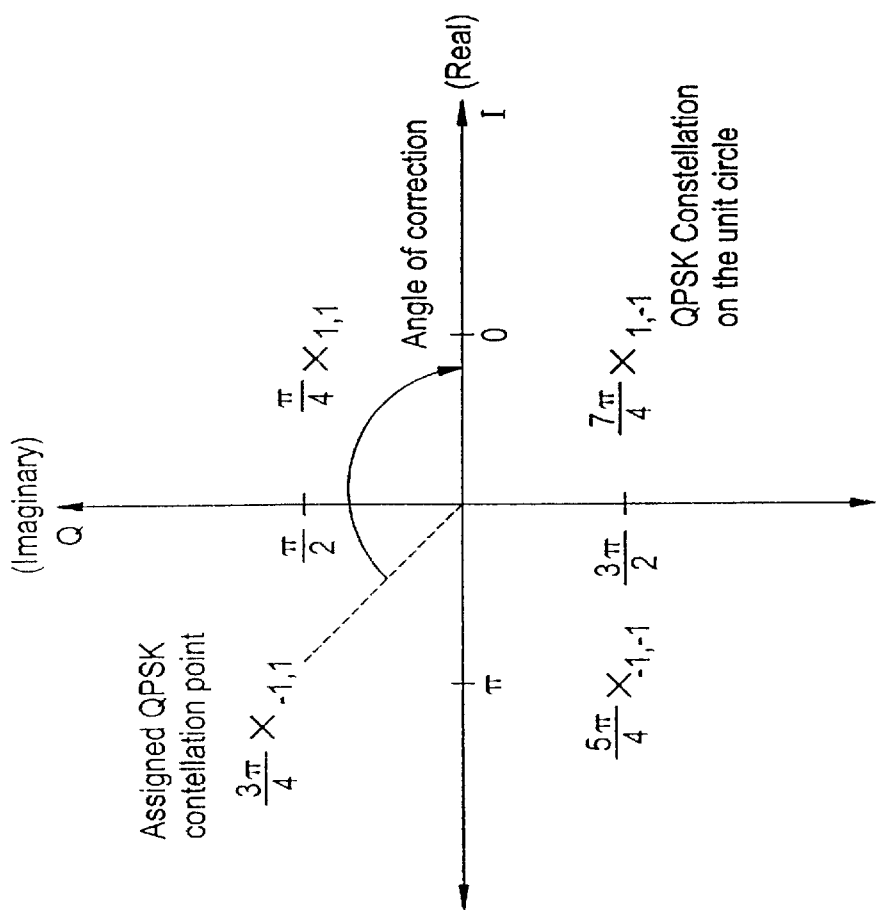
FIG. 7 is a diagram of the angle of correction corresponding to the assigned symbol.

As shown in FIG. 7, a symbol is demodulated or derotated by first determining the complex conjugate of the assigned symbol coordinates $x_{-1,-1}$, forming the correction signal 119 which is used to remove the relative phase error contained in the rake output. Thus, the rake output is effectively derotated by the angle associated with the hard decision, removing the relative phase error. This operation effectively provides a rake that is driven by a pilot signal, but without an absolute phase reference.

Figure 8:
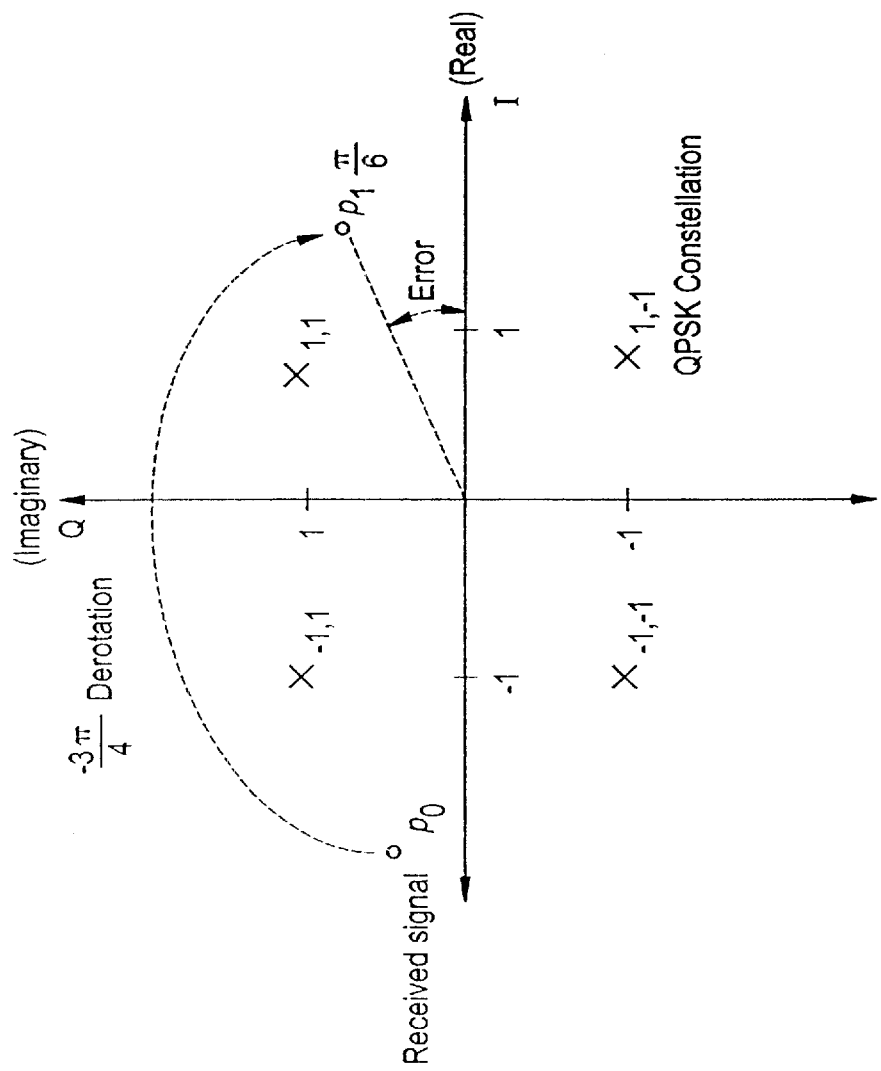
FIG. 8 is a diagram of the resultant symbol error after applying the correction corresponding to the assigned symbol.

Referring back to FIG. 4, the output 119 from the complex conjugate 123 is coupled to a complex n-dimensional mixer 117 where each output of the rake receiver 101 is mixed with the correction signal 119. The resulting products 127 are noisy estimates of the channel impulse response $p_1$ as shown in FIG. 8. The error shown in FIG. 8 is indicated by a radian distance of π/6 from the in-phase axis.

Referring back to FIG. 4, the outputs 129 of the complex n-dimensional mixer 117 are coupled to an n-dimensional channel estimator 131. The channel estimator 131 is a plurality of low-pass filters filtering each multipath component. The outputs of the n-dimensional mixer 117 are coupled to the AMF 79. These signals act as the AMF 79 filter weights. The AMF 79 filters the baseband signal to compensate for channel distortion due to multipath without requiring a large magnitude pilot signal.

Rake receivers 101 are used in conjunction with phase-locked loop (PLL) 133 circuits to remove carrier-offset. Carrier-offset occurs as a result of transmitter/receiver component mismatches and other RF distortion. The present invention 75 requires that a low level pilot signal 135 be produced by despreading 87 the pilot from the baseband signal 77 with a pilot pn sequence 91. The pilot signal is coupled to a single input PLL 133. The PLL 133 measures the phase difference between the pilot signal 135 and a reference phase of 0. The despread pilot signal 135 is the actual error signal coupled to the PLL 133.

Figure 9:
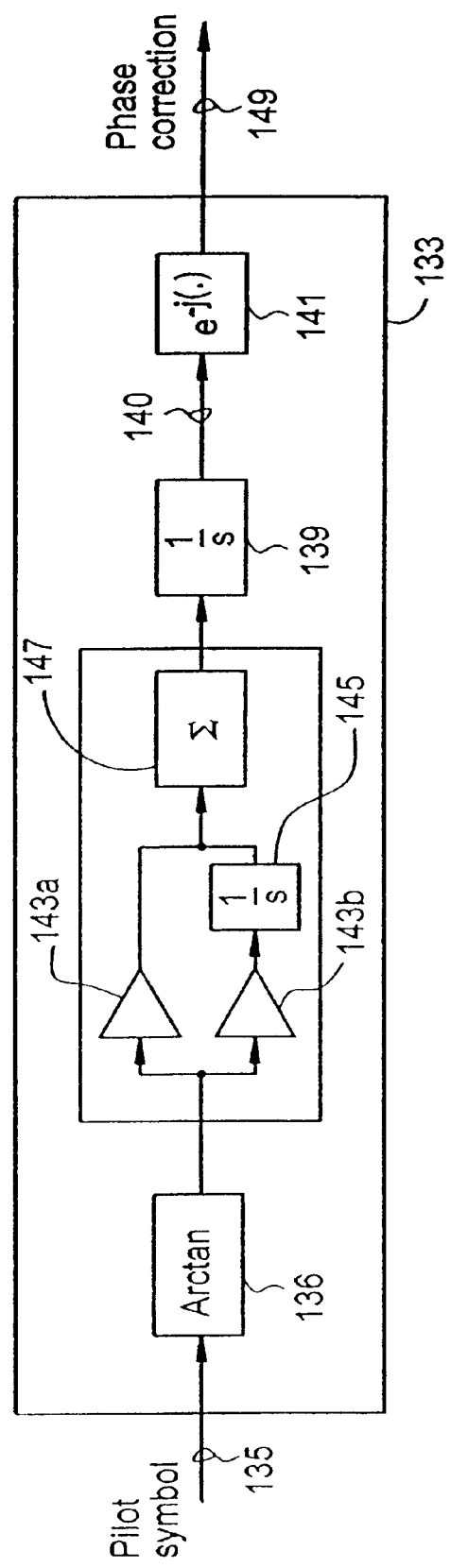
FIG. 9 is a block diagram of a conventional phase-locked loop.

A conventional PLL 133 is shown in FIG. 9. The PLL 133 includes an arctangent analyzer 136, complex filter 137, an integrator 139 and a phase-to-complex-number converter 141. The pilot signal 135 is the error signal input to the PLL 133 and is coupled to the complex filter 137. The complex filter 137 includes two gain stages, an integrator 145 and a summer 147. The output from the complex filter is coupled to the integrator 139. The integral of frequency is phase, which is output 140 to the converter 141. The phase output 140 is coupled to a converter 141 which converts the phase signal into a complex signal for mixing 151 with the baseband signal 77. Since the upstream operations are commutative, the output 149 of the PLL 133 is also the feedback loop into the system 75.

By implementing the hard decision 121 and derotation 123 of the data modulation, the process provides channel estimation without the use of a large pilot signal. If an error occurs during the hard decision process and the quadrant of the received data symbol is not assigned correctly, the process suffers a phase error. The probability of phase error is reduced, however, due to the increased signal-to-noise ratio of the traffic channel. The errors that occur are filtered out during the channel-estimation and carrier-recovery processes. The traffic channel is approximately 6 dB stronger (2×) than the level of the despread pilot.

Figure 10:
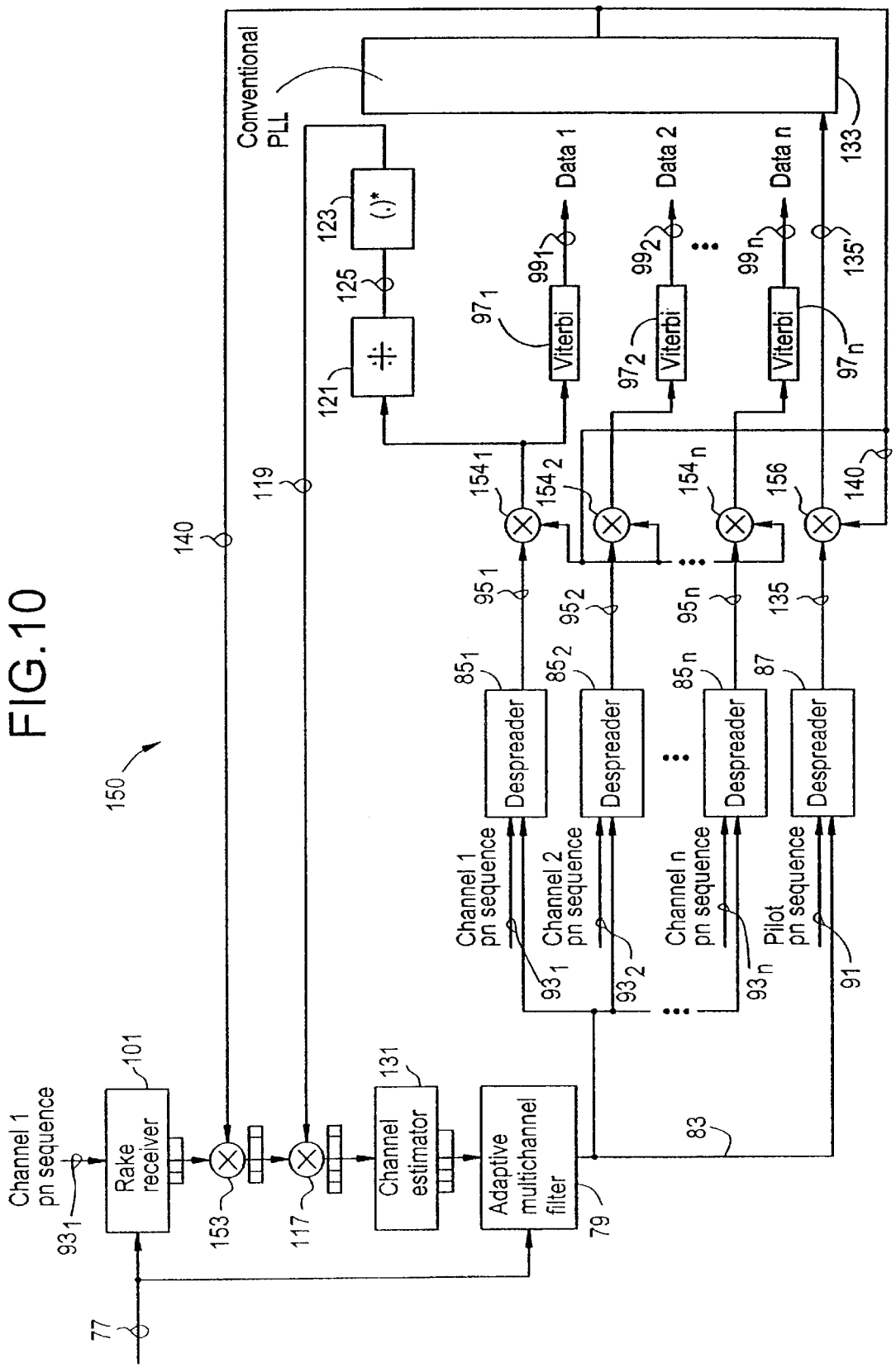
FIG. 10 is a detailed block diagram of the present invention using a pseudo-pilot signal with carrier-offset correction implemented at the symbol level.

As described earlier, the present invention can also be performed with carrier-offset correction at the symbol level. An alternative embodiment 150 implemented at the symbol level is shown in FIG. 10. The difference between the chip and symbol level processes occur where the output of the conventional PLL 133 is combined. At the symbol level, the PLL output 140 does not undergo chip conversion 141 and is introduced into the AMF 79 weights after the rake receiver 101 by another n-dimensional mixer 153. The phase correction 140 feedback must also be mixed $154_1$, $154_2$, $154_n$ with the outputs $95_1$, $95_2$, $95_n$ of each of the plurality of channel despreaders $85_1$, $85_2$, $85_n$ and mixed 156 with the output 135 of the pilot despreader 87.

Figure 11:
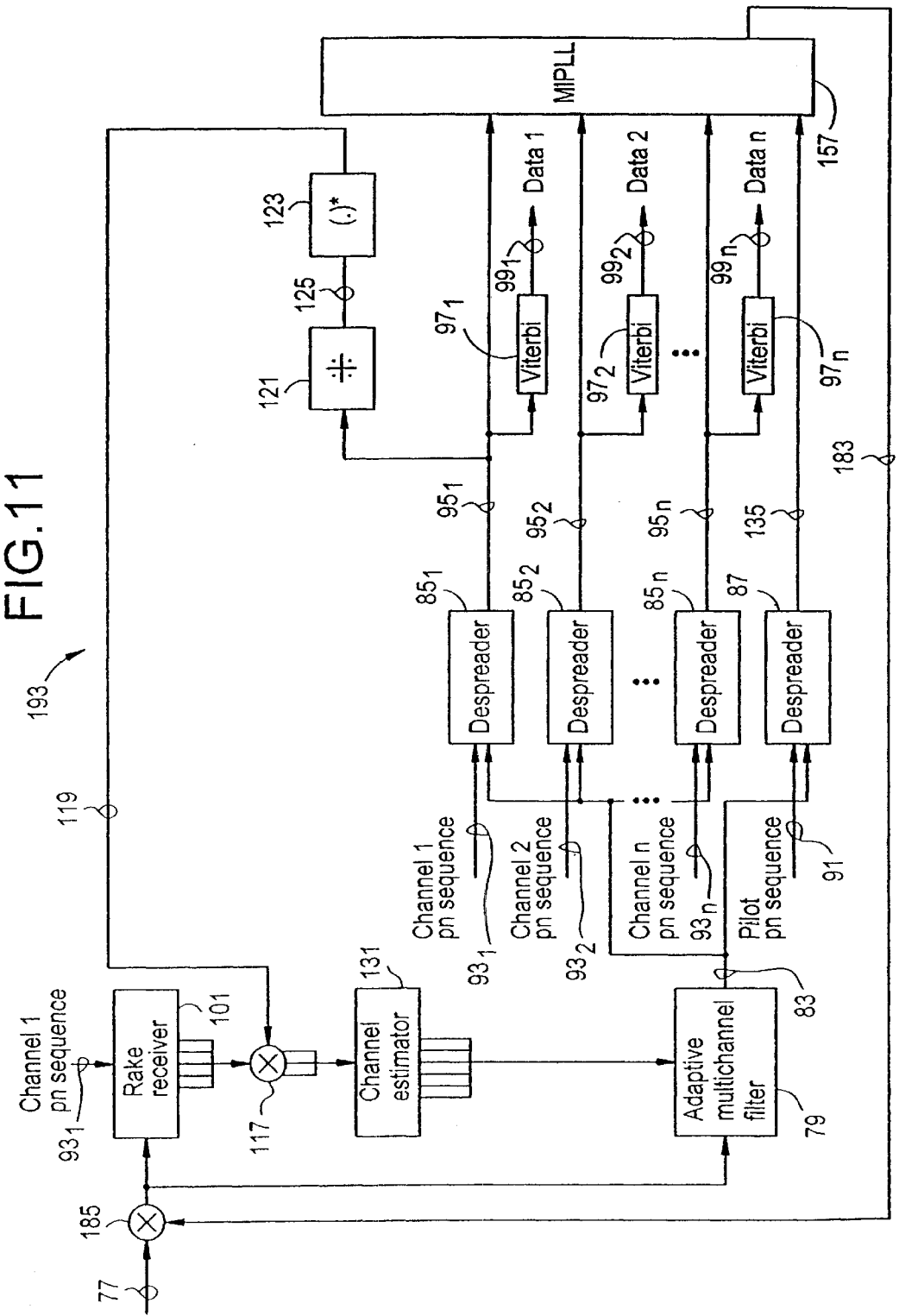
FIG. 11 is a detailed block diagram of the present invention using a pseudo-pilot signal and the MIPLL, with carrier-offset correction implemented at the chip level.

As shown in FIG. 11, another alternative embodiment 193 uses a variation of the earlier embodiments whereby a hard decision is rendered on each received symbol after despreading and derotated by a radian amount equal to the complex conjugate. The alternate approach 193 uses a plurality of channel despreaders $85_1$, $85_2$, $85_n$ and the pilot despreader 87 as inputs to a multiple input phase-locked loop (MIPLL) 157 shown in FIG. 12. Since each of the despread channels $95_1$, $95_2$, $95_n$ contains an ambiguous representation of the pilot signal, a small signal pilot 135 is required to serve as an absolute reference. The despread symbols from all channels in conjunction with the despread small signal pilot signal are input to the MIPLL 157.

Figure 12:
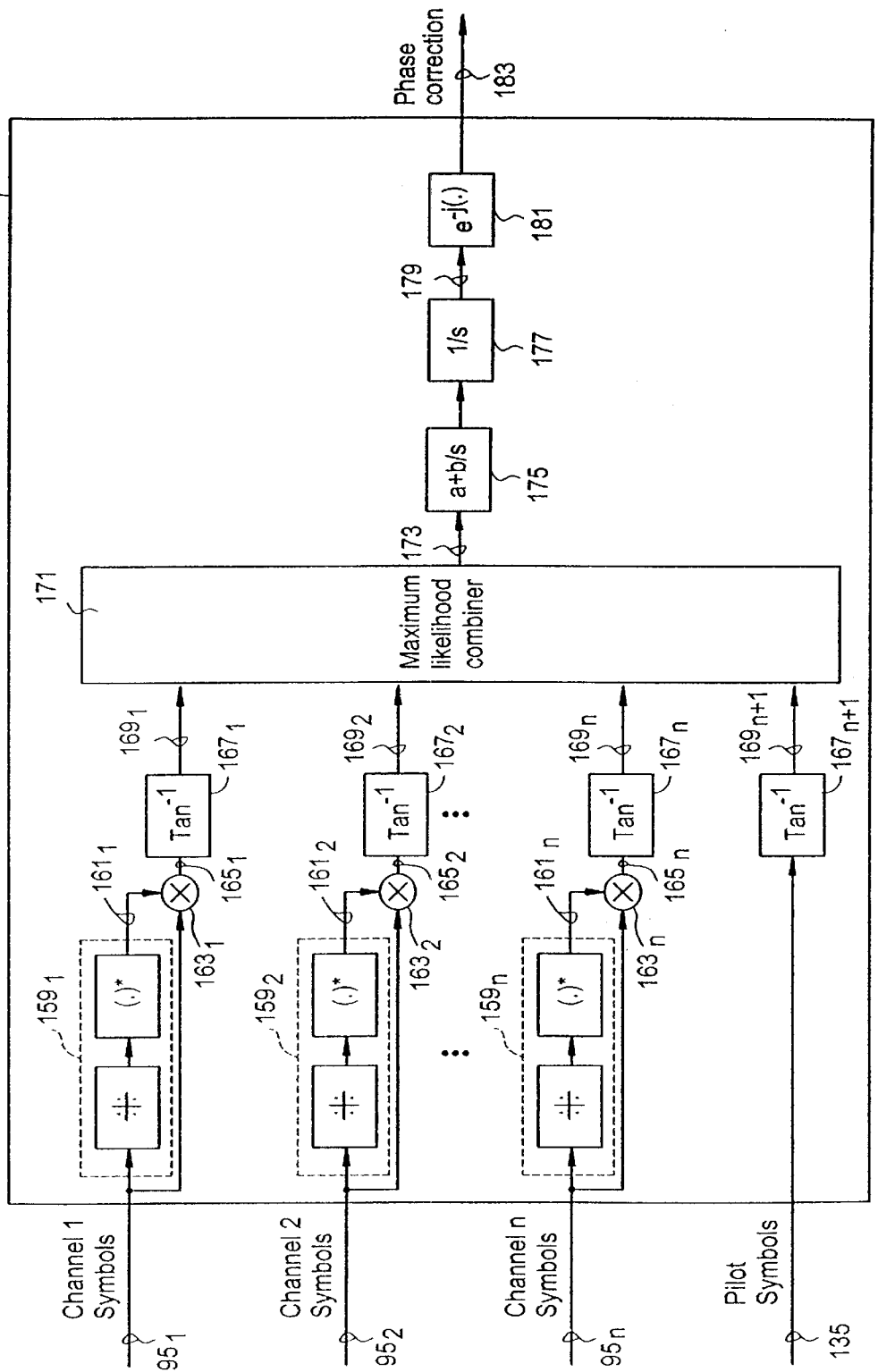
FIG. 12 is a block diagram of the multiple input phase-locked loop (MIPLL).

Referring to FIG. 12, the output from each channel $95_1$, $95_2$, $95_n$ is coupled to a hard decision/complex conjugate operation $159_1$, $159_2$, $159_n$. The derotated pseudo-pilots $161_1$, $161_2$, $161_n$ are then mixed with the delayed symbols producing a complex voltage error $163_1$, $163_2$, $163_n$. The error $165_1$, $165_2$, $165_n$ is input into a converter $167_1$, $167_2$, $167_n$, $167_{n+1}$, which takes an inverse tangent converting the complex number into a phase error $169_1$, $169_2$, $169_n$, $169_{n+1}$.

Each phase error $169_1$, $169_2$, $169_n$, $169_{n+1}$ is input into a maximum likelihood combiner 171 which assigns various weights to the plurality of inputs and produces a sum output. Also included in the sum is the small signal pilot 135 phase $169_{n+1}$ which is despread 135 and converted $167_{n+1}$. The weighting of the small pilot signal may be emphasized since its phase is unambiguous.

The output of the combiner 173 is the estimate of the carrier-offset and is coupled to a complex filter 175 and coupled to an integrator 177. All channels contribute to the estimate of the carrier-offset frequency with the absolute phase error removed by the unambiguous pilot signal. The integrator accumulates the history of the summed signal over many samples. After integration, the estimate of the phase error is output 179 converted to a complex voltage and output 183.

Referring back to FIG. 11, the output 183 of the MIPLL 157 is coupled to a complex mixer 185 upstream of the rake receiver. This completes the error feedback for the MIPLL 157. Even though this embodiment requires additional resources and complexity, the MIPLL 157 architecture can be efficiently implemented and executed in a digital signal processor (DSP).

Figure 13:
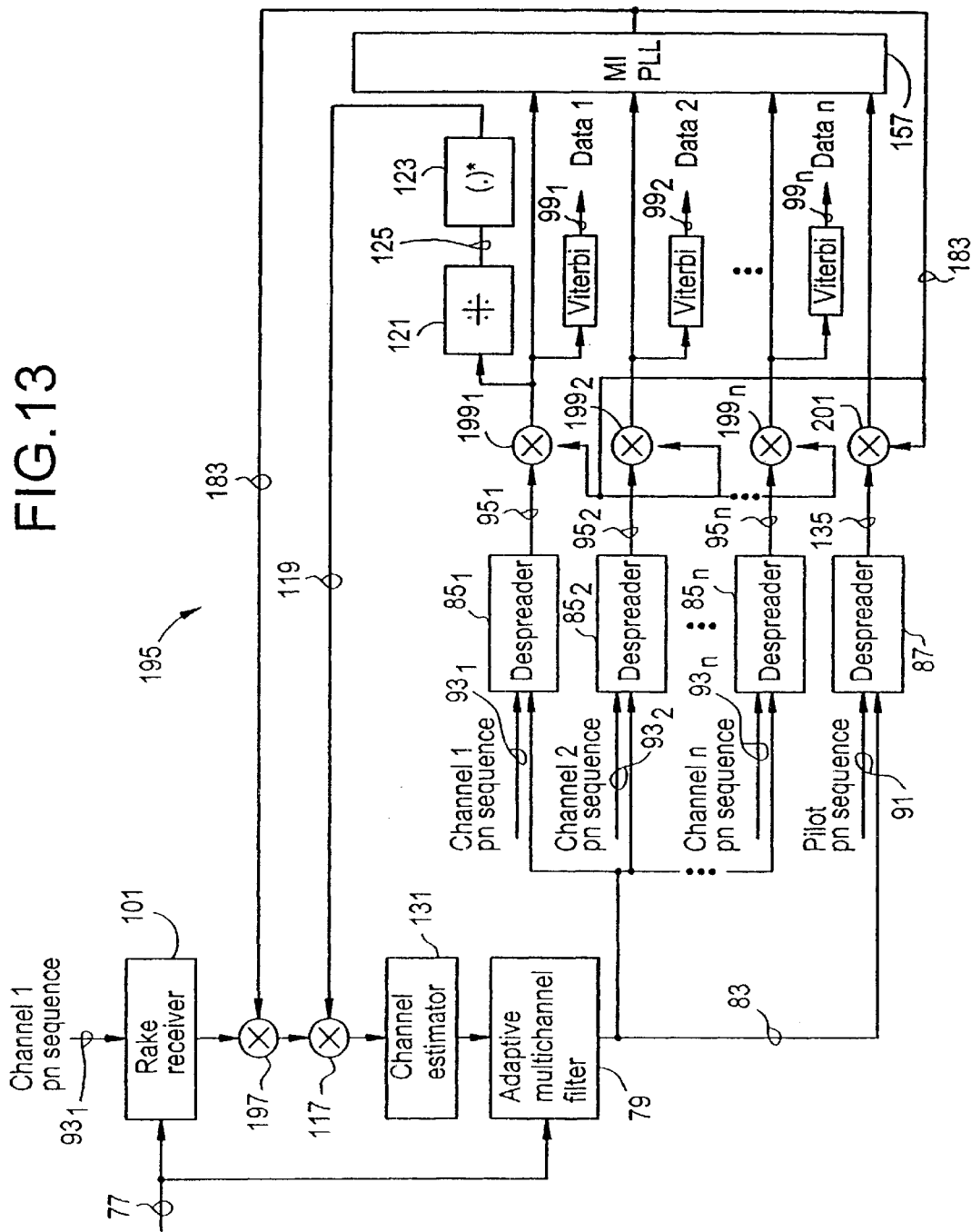
FIG. 13 is a detailed block diagram of the present invention using a pseudo-pilot signal and the MIPLL, with carrier-offset correction implemented at the symbol level.

Referring now to the alternative embodiment 195 shown in FIG. 13, this embodiment 195 mixes the output of the MIPLL 157 at the symbol level. The MIPLL 157 is mixed 197 with the output of the rake receiver 101. As described above, the output of the rake receiver 101 is at the symbol level. The symbol-to-chip conversion 181 in the MIPLL 157 architecture is disabled. Since the output 183 of the MIPLL 157 is mixed with the outputs of the rake 101 which are used only for the AMF 79 weights, the phase correction for carrier-offset must be added to the portion of the receiver that processes traffic data. A plurality of mixers $199_1$, $199_2$, $199_n$ downstream of each channel despreader $85_1$, $85_2$, $85_n$ and a mixer 193 downstream of the pilot despreader 87 are therefore required to mix the phase-corrected output 183 (at the symbol level) as feedback into the system.

The present invention maintains the transmitted pilot signal at a low level to provide an absolute phase reference while reducing pilot interference and increasing air capacity. The net effect is the virtual elimination of the pilot overhead.

While specific embodiments of the present invention have been shown and described, many modifications and variations could be made by one skilled in the art without departing from the spirit and scope of the invention. The above description serves to illustrate and not limit the particular form in any way.

What is claimed is:

1. A receiver for use in a communication station of a CDMA system wherein a plurality of communication stations communicate with each other over a CDMA air interface using a plurality of channels and a pilot signal for carrier-offset recovery during reception, the receiver comprising:
   an adaptive matched filter for receiving demodulated CDMA communication signals producing a filtered signal by using a weighting signal;
   a rake receiver for receiving the demodulated CDMA communication signals and a pseudo-noise signal generated for a selected channel and producing a filter weighting signal;
   means for defining the filter weighting signal with a correction signal, said correction signal to produce the weighting signal used by said adaptive matched filter;
   a channel despreader for said selected channel coupled to said adaptive matched filter output for despreading said filtered signal using the pseudo-noise signal generated for said selected channel to produce a despread channel signal of said selected channel;
   a pilot channel despreader for a pilot channel coupled to said adaptive matched filter output for despreading said filtered signal using a pseudo-noise signal generator for said pilot channel to produce a despread pilot signal of said pilot channel;
   a hard decision processor in association with a complex conjugate processor for receiving the despread channel signal of said selected channel and producing said correction signal; and
   a phase-locked loop utilizing at least said despread pilot signal for producing a phase correction signal which is applied to produce phase-corrected channel signals.

2. The receiver according to claim 1 further comprising a plurality of channel despreaders, each coupled to said adaptive matched filter output for despreading said filtered signal each using an associated pseudo-noise signal generator to produce a plurality of despread channel signals.

3. The receiver according to claim 2 wherein the number of channel despreaders is three.

4. The receiver according to claim 2 wherein said phase-locked loop phase correction signal is at a chip level and is applied to said demodulated CDMA communication signals.

5. The receiver according to claim 2 wherein each of the plurality of channels is a complex, bi-phase modulated signal comprised of symbols including in-phase and quadrature components representing data, said hard decision processor compares each despread channel signal symbol to one of four possible quadrature constellation points and assigns each of said symbols to a nearest constellation point, and said complex conjugate processor derotates each of said symbols by determining a complex conjugate of each of said assigned points to produce said correction signal.

6. The receiver according to claim 2 wherein said phase-locked loop further comprises a plurality of inputs corresponding with said plurality of channel despreaders.

7. The receiver according to claim 6 wherein said phase-locked loop further comprises:
   a hard decision processor in association with said complex conjugate processor with a local feedback loop for each of said corresponding channel despreader inputs to produce an error estimate signal for a respective channel signal;
   each said error estimate signal and said despreader pilot signal coupled to an inverse tangent processor to produce a corresponding phase correction signal; and
   said respective channel phase correction signal and pilot phase correction signal coupled to a maximum likelihood combiner producing a combination correction signal coupled to an integrator to produce said phase correction signal.

8. The receiver according to claim 7 wherein the number of channel despreaders is three.

9. The receiver according to claim 1 wherein said phase-locked loop phase correction signal is at a symbol level and is applied to said filter weighting signal and to said despread channel signals of said channel and pilot channel despreaders.

10. The receiver according to claim 9 further comprising a plurality of channel despreaders, each coupled to said adaptive matched filter output for despreading said filtered signal using an associated pseudo-noise signal generator to produce a plurality of despread channel signals.

11. The receiver according to claim 10 wherein the number of channel despreaders is three.

12. The receiver according to claim 10 wherein said phase-locked loop further comprises a plurality of signal inputs corresponding with said plurality of channel despreaders.

13. The receiver according to claim 12 wherein said phase-locked loop further comprises:

a hard decision processor in association with a complex conjugate processor with a local feedback loop for each of said plurality of signal inputs, each producing an error estimate for a respective channel signal;

each of said channel error estimates and said despreader pilot signal coupled to an inverse tangent processor outputting a channel phase correction signal; and said channel phase correction signal and said pilot phase correction signal coupled to a maximum likelihood combiner producing a combination correction signal coupled to an integrator to produce said phase correction signal.

14. The receiver according to claim 13 wherein the number of channel despreaders is three.

15. A method of receiving at least one of a plurality of channels over a CDMA air interface using a reduced magnitude pilot signal for carrier-offset recovery during reception wherein a plurality of communication stations communicate with each other comprising the steps:

receiving demodulated CDMA communication signals;

filtering said received demodulated CDMA communication signals with an adaptive matched filter to produce a filtered signal by using a weighting signal;

producing a filter weighting signal with a rake receiver using said demodulated CDMA communication signals and a pseudo-noise signal generated for a selected channel;

refining said filter weighting signal with a correction signal;

despreading said selected channel from said filtered signal using the pseudo-noise signal for said selected channel to produce a despread channel signal of said selected channel;

despreading a pilot channel from said filtered signal using a pseudo-noise signal generated for said pilot channel to produce a despread pilot signal of said pilot channel;

processing said selected despread channel signal with a hard decision processor in association with a complex conjugate processor to produce said correction signal; and generating a phase correction signal from said despread pilot signal with a phased-locked loop to phase-correct said selected channel signal.

16. The method according to claim 15 wherein said phase correction signal is at a chip level.

17. The method according to claim 16 wherein the step of despreading said selected channel also includes despreading a plurality of channels to produce despread channel signals.

18. The method according to claim 17 wherein said step of generating a phase correction signal further includes the steps of:

assigning a received symbol to one of four possible quadrature constellation points for said despread selected channel signal and each of said despread channel signals;

derotating each of said assigned symbols for said despread selected channel signal and each of said despread channel signals by determining the complex conjugate of each of said assigned points to produce respective error estimate signals;

coupling each of said error estimate signals and said despread pilot signal to inverse tangent processors to produce corresponding phase correction signals; and combining said channel phase correction signal and said pilot phase correction signal to produce said phase correction signal.

19. The method according to claim 15 wherein said phase correction signal is at a symbol level.

20. The method according to claim 19 wherein the step of despreading said selected channel also includes despreading a plurality of channels to produce despread channel signals.

21. The method according to claim 20 wherein said step of generating a phase correction signal further includes the steps of:

assigning a received symbol to one of four possible quadrature constellation points for said despread selected channel signal and each of said despread channel signals;

derotating each of said assigned symbols for said despread selected channel signal and each of said despread channel signals by determining the complex conjugate of each of said assigned points to produce respective error estimate signals;

coupling of each said error estimate signals and said despread pilot signal to inverse tangent processors to produce corresponding phase correction signals; and combining said channel phase correction signal and said pilot phase correction signal to produce said phase correction signal.

* * * * *